United States Patent [19]
Lindahl et al.

[11] 3,898,816
[45] Aug. 12, 1975

[54] CLUTCH HAVING ROTATABLE POWER TRANSMITTING PARTS WHICH SHIFT RELATIVE TO EACH OTHER AT VARIABLE TORQUE LOADS

[75] Inventors: Robert E. Lindahl, Elkhart; Charlie N. French, South Bend, both of Ind.

[73] Assignee: Masco Corporation of Indiana, Elkhart, Ind.

[22] Filed: Jan. 9, 1974

[21] Appl. No.: 432,087

[52] U.S. Cl.......................... 64/29; 254/86; 64/30 R
[51] Int. Cl............................................. F16d 3/56
[58] Field of Search................. 64/29, 30 R, 27 CT; 254/86, 103

[56] References Cited
UNITED STATES PATENTS

| | | | |
|---|---|---|---|
| 2,067,377 | 1/1937 | Burns et al............................ | 64/29 |
| 2,311,230 | 2/1943 | Hill......................................... | 64/29 |
| 2,561,136 | 7/1951 | Richardson........................... | 64/29 |
| 2,802,354 | 8/1957 | Bohnhoff et al...................... | 64/29 |
| 3,592,443 | 7/1971 | Budrow............................. | 254/86 R |

*Primary Examiner*—Samuel Scott
*Assistant Examiner*—Randall Heald
*Attorney, Agent, or Firm*—Oltsch & Knoblock

[57] ABSTRACT

A clutch which includes a shaft part rotatable about a longitudinal axis and a power transmitting part journaled upon the shaft part for rotation relative to the shaft part about such axis. The power transmitting part includes an end face which is located generally perpendicular to the longitudinal axis of the shaft part. A groove is formed in the power transmitting part end face which is defined by opposed beveled shoulders. The shaft part carries an arm member which normally fits within the groove in the end face of the power transmitting part to cause the unitary rotation of the shaft and power transmitting parts. Upon the application of an excessive torque to either the shaft part or power transmitting part, the arm member carried by the shaft part slides over one of the beveled shoulders to permit relative rotation between the shaft and power transmitting parts.

3 Claims, 5 Drawing Figures

PATENTED AUG 12 1975  3,898,816

SHEET 1

3,898,816

CLUTCH HAVING ROTATABLE POWER TRANSMITTING PARTS WHICH SHIFT RELATIVE TO EACH OTHER AT VARIABLE TORQUE LOADS

SUMMARY OF THE INVENTION

This invention relates to an improved clutch having rotating parts which, when specified torques are exceeded and depending upon the direction of rotation of the clutch, experience relative rotational movement between each other.

In this invention the clutch includes a shaft part which is rotatable about a longitudinal axis and a power transmitting part which is journaled upon the shaft part. The power transmitting part is rotatable relative to the shaft part about the longitudinal axis of the shaft part and has an end face which is generally perpendicular to such longitudinal axis. The end face of the power transmitting part has a pair of spaced shoulders formed therein which define a groove. The shaft part carries an arm means which fits within the groove of the power transmitting part and which when abutting either of the spaced shoulders of the groove causes the shaft and power transmitting parts to rotate as a unit. The shoulders of the groove in the power transmitting part are beveled, each at a different angle relative to the end face of the power transmitting part. Such beveling of the groove shoulders at different angles permits the arm means carried by the shaft part to slide out of the groove over a respective shoulder, thus causing relative movement between the power transmitting and shaft parts when a specified torque applied to the parts, dependent upon the direction of rotation of the clutch and at least in part upon the angles of bevel of the groove shoulders, is exceeded.

It is an object of this invention to provide an improved clutch which connects two parts having bidirectional rotational movement and which permits relative rotative movement between the respective parts when a selected torque, depending upon the direction of rotation of parts, is exceeded.

Another object of this invention is to provide a clutch member which interconnects a drive motor to extensible and retractable lift parts of a jacking device and which permits a greater driving torque to be transmitted from the motor to the extensible-retractable lifts when the lifts are being retracted than when the lifts are being extended.

It is another object of this invention to provide a clutch which interconnects a drive motor to the extensible and retractable lifts of a jack and which serves to substantially prevent the lifts from becoming locked in an extended position under load when attempting to retract the lifts.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
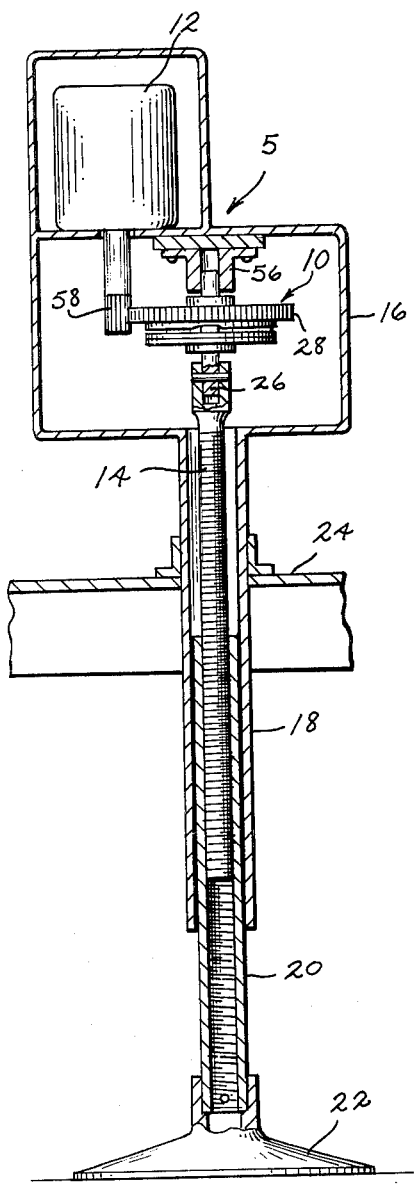
FIG. 1 is a longitudinal sectional view of a jack incorporating the clutch of this invention therein.
Figure 3:
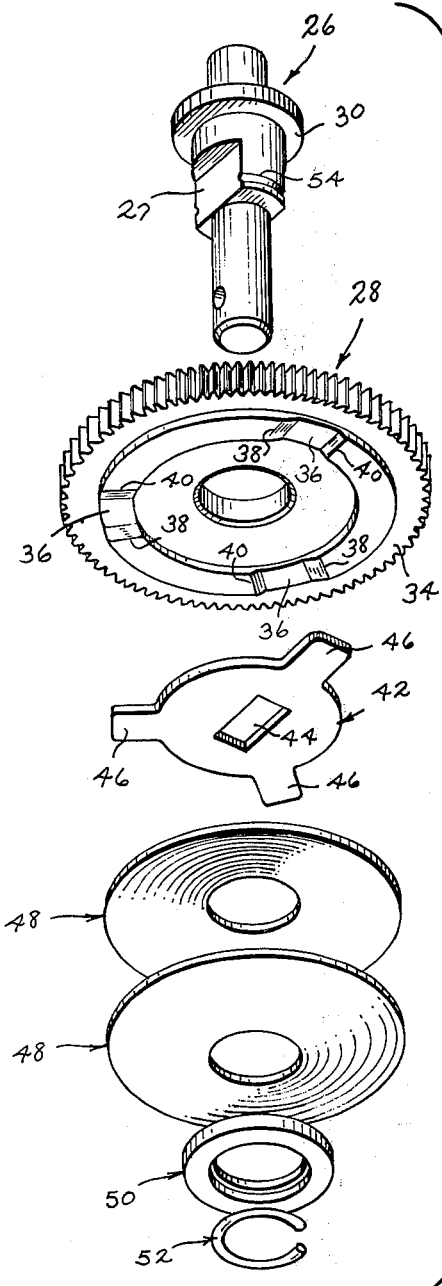
FIG. 3 is a perspective view of the clutch of FIG. 2 showing the component parts thereof in exploded form.
Figure 2:
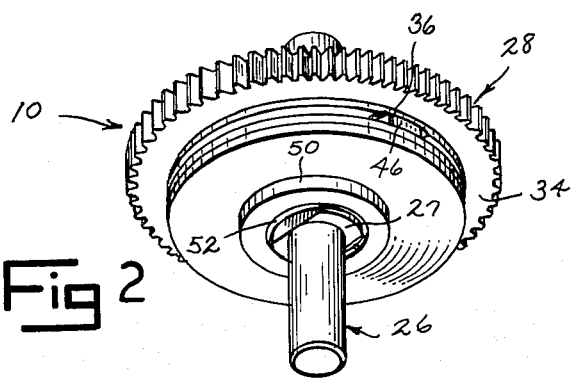
FIG. 2 is a perspective view of the clutch utilized in the jack of FIG. 1.

In FIG. 1 clutch 10 of this invention is shown operatively connected between an electrical drive motor 12 and a jackscrew 14. Clutch 10 and drive motor 12 are supported within a housing 16 from which depends a lift part 18. A lift part 20 is telescopically fitted into the lower open end of lift part 18 and is internally threaded to receive jackscrew 14. A suitable base 22 which is adapted to rest upon the ground or a similar foundation is secured to the lower end of lift part 20. Lift part 18 may be secured to the tongue 24 of a trailer. The extension and retraction of lift parts 18 and 20 through the rotation of jackscrew 14 will cause the raising and lowering of tongue 24 of the trailer.

Figure 4:
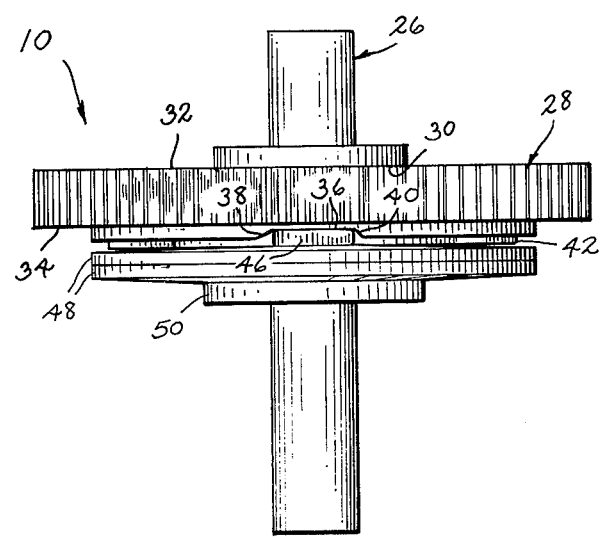
FIG. 4 is a side view of the clutch of FIG. 2 showing the component parts thereof in an operative power transmitting relationship.
Figure 5:
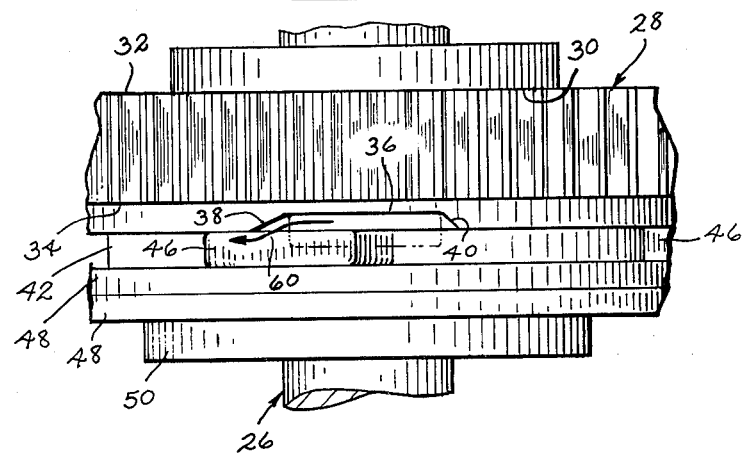
FIG. 5 is an enlarged fragmentary side view of the clutch of FIG. 2 showing the component parts thereof in an operative non-power transmitting relationship.

Clutch 10 includes a shaft 26 upon which a power transmitting or gear part 28 is journaled. Gear part 28 has one end face 32 abutting a shoulder 30 on shaft 26. The opposite end face 34 of gear part 28 is generally perpendicularly oriented relative to the rotational axis of shaft 26. A plurality of grooves 36 are formed in end face 34. Grooves 36 are preferably equal radially spaced from the axis of rotation of shaft 26 and are equal angularly spaced apart. Each groove 36 is defined by a pair of opposing shoulders 38 and 40. Each shoulder 38 and 40 is beveled relative to the plane of end face 34 with the angle of bevel of shoulder 38 being less than the angle of bevel of shoulder 40, as best seen in FIGS. 4 and 5. In the illustrated embodiment, the angle of bevel of each shoulder 38 is approximately 35° while the angle of bevel of each shoulder 40 is approximately 45°.

A plate member 42 having a centrally located slot 44 formed therein is fitted slidably over a complementally formed portion 27 of shaft 26 so as to be rotatable with the shaft but shiftable longitudinally relative to the shaft. Plate member 42 includes a plurality of radially extending arms 46. Arms 46 are equal in number to the number of grooves 36 formed in gear part end face 34. Arms 46 of plate member 42 are also equal angularly spaced apart with each arm fitting into a groove 36 and positioned between shoulders 38 and 40 of the groove. A yieldable biasing means anchored to shaft 26 serves to urge arms 46 of plate member 42 into grooves 36. This biasing means may constitute a pair of conically shaped spring washers 48. Washers 48 are positioned in a back-to-back relationship with the conical end portions thereof protruding outwardly in opposite directions and are fitted over shaft 26 and against plate member 42. A retainer ring 50 is also fitted over shaft 26 and abutted against washers 48. Washers 48 are slightly compressed between plate member 42 and retainer ring 50 and held in position by means of a spring lock ring 52. Lock ring 52 overlies retainer ring 50 and fits within a groove 54 formed in the shaft.

One end of shaft 26 is pinned to the upper end of jackscrew 14 while the opposite end of the shaft is journaled within a bearing block 56 secured to jack housing 16. The drive shaft of motor 12 carries a gear 58 which intermeshes with the toothed circumferential edge of gear part 28 of clutch 10. Actuation of motor 12 causes the unitary rotation of clutch parts 26 and 28 and the resulting rotation of jackscrew 14 and the extension and retraction of lift parts 18 and 20. During this rotation of shaft part 26 and gear part 28, arms 46 of plate member 42 abut groove shoulders 38 or 40, depending upon the direction of rotation of the clutch. If the torque applied by motor 12 to jackscrew 14 exceeds a specific amount, arms 46 of plate member 42 will slide upwardly over the abutting beveled shoulders of grooves 36, causing washers 48 to yield or slightly collapse, and onto end face 34 of gear part 28 as indicated by arrow 60 in FIG. 5 to permit relative rotational movement or slippage between shaft 26 and gear part 28. In this manner when a specified torque between motor 12 and jackscrew 14 is exceeded, rotation of the jackscrew will stop and the drive motor protected from overloading. For a given amount of force applied by washers 48 to plate member 42, the amount of torque applied to jackscrew 14 necessary to cause relative movement between shaft 26 and gear part 28 will be principally dependent upon the angle of inclination or bevel of shoulders 38 and 40 of each groove 36. The less the angle of inclination of a shoulder of groove 36, the less amount of torque required to cause arms 46 to slide upwardly over the shoulder and across end face 34 of the gear part.

In the construction of the jack 5 illustrated in FIG. 1, arms 46 of plate member 42 will abut shoulders 38 of grooves 36 during the time that lift parts 18 and 20 are being extended or the jack is doing the lifting. When the direction of rotation of motor 12 is reversed and lift parts 18 and 20 are being retracted, arms 46 of the plate member will abut shoulders 40 of grooves 36. Due to the fact that the angle of inclination of shoulders 40 is greater than the angle of inclination of shoulders 38 of grooves 36, clutch 10 in jack 5 will impart a greater torque to jackscrew 14 when lift parts 18 and 20 are being retracted and the trailer load is being lowered. This allows motor 12 to apply a greater turning force to jackscrew 14 when it is desired to lower the lifted trailer so as to overcome any frictional interlock which can occur when the jack is under a load and lift parts 18 are in an extended position of rest.

It is to be understood that the invention is not to be limited to the details above given but may be modified within the scope of the appended claims.

What we claim is:

1. In a clutch member including a shaft part rotatable about a longitudinal axis, a power transmitting part journaled upon said shaft part for rotation relative to the shaft part about said longitudinal axis, said power transmitting part having an end face the plane of which is generally perpendicular to the said longitudinal axis, said end face having a pair of opposingly spaced first and second shoulder means defining a groove therebetween, said groove being spaced spaced from said longitudinal axis, arm means anchored to said shaft part and fitting within said groove, said arm means abutting said first shoulder means to cause said power transmitting part and shaft part to rotate as a unit about said longitudinal axis when one of said shaft and power transmitting parts is rotated in one direction of rotation, said arm means abutting said second shoulder means to cause said power transmitting part and shaft part to rotate as a unit about said longitudinal axis when said one power transmitting or shaft part is rotated in the opposite direction of rotation, each of said first and second shoulder means being beveled relative to the plane of said end face, means yieldably urging said arm means into said groove wherein the arm means will be caused to ride over said first and second shoulder means to cause relative rotative movement between said shaft and power transmitting parts when a specific torque between said shaft and power transmitting parts is exceeded, the improvement wherein the angle of bevel of said first shoulder means exceeds the angle of bevel of said second shoulder means, the respective angles of bevel of said first and second shoulder means being determinative of said torque at which said power transmitting and shaft parts experience said relative rotative movement, said relative rotative movement between said shaft and power transmitting parts occurring in said one direction of rotation at a higher torque than the torque at which such relative rotative movement between such parts occurs in said opposite direction of rotation.

2. The clutch member of claim 1 and a plurality of said grooves each defined by a pair of said first and second shoulder means, said grooves being radially aligned relative to said longitudinal axis of the shaft part and equal angularly spaced apart, said arm means constituting a plate secured for rotation with said shaft part and having a plurality of radially extending arm parts, said arm parts being equal in number to said grooves with each arm part fitting within a said groove.

3. In a trailer jack having vertically oriented extensible and retractable lift parts, a motor, means operatively connecting said motor to said lift parts for causing the extension and retraction thereof, said connecting means including a clutch member, said clutch member including a shaft part rotatable about an axis and a power transmitting part journaled upon said shaft part for rotation relative to the shaft part about said axis, said power transmitting part having an end face the plane of which is generally perpendicular to said axis, said end face having a pair of spaced first and second shoulder means defining a groove therebetween, said groove being spaced from said longitudinal axis, arm means anchored to said shaft part and fitting within said groove, said arm means abutting said first shoulder means when said power transmitting part and shaft part are rotated as a unit in one direction about said axis by said motor to extend said lift parts, said arm means abutting said second shoulder means when said power transmitting part and shaft part are rotated as a unit in an opposite direction about said axis by said motor to retract said lift parts, each of said first and second shoulder means being beveled relative to the plane of said end face, means yieldably urging said arm means into said groove whereby the arm means will be caused to ride over said first and second shoulder means to cause relative rotative movement between said shaft part and power transmitting part when a specific torque between said shaft and power transmitting parts as applied by said motor is exceeded, the improvement wherein the angle of bevel of said second shoulder means exceeds the angle of bevel of said first shoulder means, the respective angles of bevel of said first and second shoulder means being determinative of such torque at which said power transmitting and shaft parts experience relative rotative movement, said relative rotative movement between said shaft and power transmitting parts occurring in said one direction of rotation at a lower torque than such relative rotative movement occurs in said opposite direction of rotation.

* * * * *